United States Patent [19]

Smetana

[11] 3,792,475
[45] Feb. 12, 1974

[54] RADAR TARGET SIMULATOR

[75] Inventor: Gary M. Smetana, Endwell, N.Y.

[73] Assignee: The United States of America as represented by the Secretary of the Navy, Washington, D.C.

[22] Filed: Mar. 9, 1972

[21] Appl. No.: 233,065

[52] U.S. Cl................ 343/17.7, 35/10.4, 343/18 E
[51] Int. Cl............................ G01s 7/40, G06g 7/78
[58] Field of Search........... 343/17.7, 18 E; 35/10.4; 325/131, 132, 166, 168

[56] References Cited
UNITED STATES PATENTS

| | | | |
|---|---|---|---|
| 3,452,354 | 6/1969 | Neuendorf | 343/17.7 |
| 3,365,718 | 1/1968 | Borg | 343/18 E |
| 2,053,780 | 9/1960 | Goldfischer | 343/17.7 |
| 2,928,086 | 3/1960 | Rubino et al. | 343/17.7 |
| 3,219,744 | 11/1965 | Mazziotti et al. | 343/17.7 |
| 3,320,349 | 5/1967 | Pollack et al. | 343/17.7 |
| 2,671,896 | 3/1954 | Rosa | 343/17.7 |

Primary Examiner—Maynard R. Wilbur
Assistant Examiner—G. E. Montone
Attorney, Agent, or Firm—R. S. Sciascia; L. I. Shrago

[57] ABSTRACT

Apparatus is disclosed which simulates the operation of a plurality of radar transmitters so as to permit an evaluation of electronic countermeasure equipment. The system generates sequences of pulsed radio frequency signals whose carrier frequency, modulation, amplitude and power lever are controllable to realistically reflect the signal conditions which may be encountered by an aircraft when a multiplicity of radar emitters are operating simultaneously in its vicinity.

3 Claims, 1 Drawing Figure

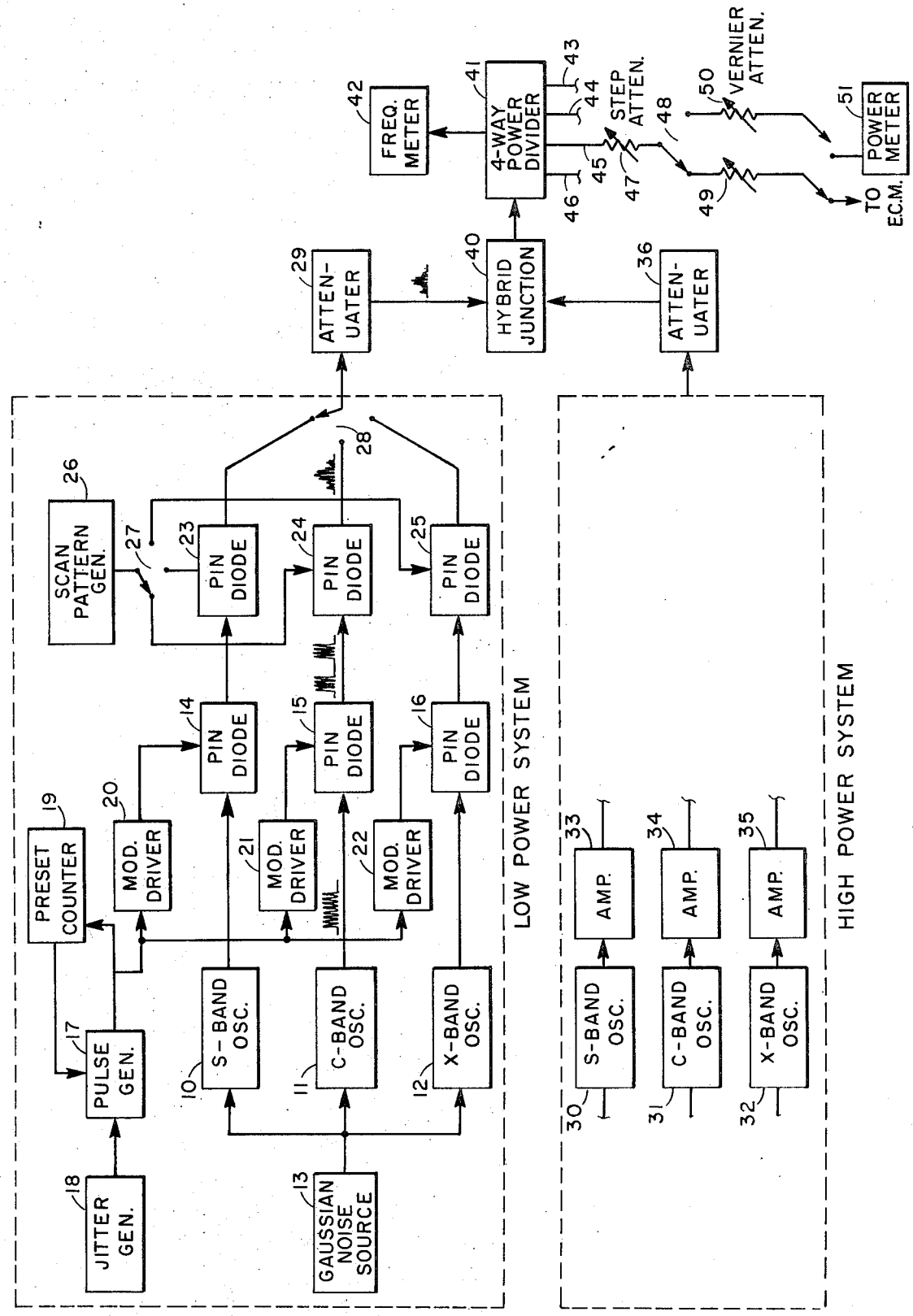

RADAR TARGET SIMULATOR

The present invention relates generally to apparatus for simulating the operation of a multiplicity of radar transmitters and, more particularly, to an arrangement which reproduces the various signal conditions which may be encountered when a multiplicity of radar sets are operating to detect targets in their vicinity.

The use of electronic countermeasure systems for jamming or otehwise blocking radar equipment is well known. The effectiveness of these systems, to a large extent, depends upon a knowledge of the operational characteristics of the different radars being used. To monitor this effectiveness, simulators have been devised to reproduce the radar signal environment. However, these systems, for the most part, do not realistically reproduce the actual radar signals because they do not take into account, for example, any frequency instability or irregularities of the radar transmitters or changing signal conditions brought about by different antenna scanning patterns.

The simulator of the present invention permits the evaluation or testing of electronic countermeasure systems under conditions which may involve the simultaneous processing of a number of signals that duplicate a multiplicity of radar sources having different operational characteristics. The apparatus which accomplishes this includes circuits for providing incoherence to the various signals so as to more closely duplicate the actual operating conditions and to allow the frequency discriminating elements of the countermeasure system to be evaluated. Not only are the various signals given an arbitrary degree of frequency instability but, additionally, the number of signals in any one period of time may be controlled to ascertain how the system responds to a limited exposure to the various radar transmitters. To further improve the realistic nature of the radar signal environment, all of the radio frequency signals may have their modulation controlled to conform to different selected antenna scanning patterns. Furthermore, the amplitude of the signals may be changed over wide limits to check, for example, the priority of decision-making ability of the countermeasure system under test. Thus, a weak but imminent radar threat can be simulated in a frequency adjacent to a strong but nonthreat radar signal, allowing detection and proper response to the threat signal.

It is accordingly a primary object of the present invention to provide a system for simulating an environment wherein a nultiplicity of radar signals are present in order to evaluate the response of electronic countermeasure systems.

Another object of the present invention is to provide a simulator which develops a multiplicity of radio frequency signals having diverse characteristics which closely reflect signal conditions which occur in an area under radar surveillance.

Another object of the present invention is to provide a simulator for use in evaluating electronic countermeasure equipment to determine its effectiveness in classifying various radar transmitters.

Other objects, advantages and novel features of the invention will become apparent from the following detailed description of the invention when considered in conjunction with the accompanying drawing, the single FIGURE of which schematically illustrates the one illustrative embodiment of the invention.

Referring now to this FIGURE, it will be seen that the over-all simulator at one end is subdivided into a low-power signal processing system and a high-power system which differ only to the extent that appropriate high-power amplifying circuits are included in the latter system in order to develop corresponding signals of greater amplitude.

The low-power system includes an S-band oscillator 10, a C-band oscillator 11 and an X-band oscillator 12, with each adapted to have its frequency varied by a common Gaussian noise source 13. Each of the oscillators thus develops a continuous output signal whose frequency at any one particular time departs from its center or average value by an amount depending upon the amplitude of the signal then being supplied to its control circuit from noise source 13. Since this source is of a random nature, a similar degree of randomness is imparted to the output signals from the various oscillators.

It will be appreciated that this method of controlling the various oscillators provides incoherence to each of the signal sources in the over-all system and creates a frequency instability which reproduces to a high degree an actual radar environment.

To form pulsed radio frequency signals, the outputs of the oscillators are supplied to PIN diodes 14, 15 and 16. Each of these diodes is adapted to be biased to conduction by a pulse derived from pulse generator 17. This pulse generator, therefore, has its output fed to suitable modulator drivers 20, 21 and 22 which are in the control circuits of these diode assemblies. These drivers, it will be appreciated, merely impart to the pulse appropriate power characteristics for controlling the individual diodes.

In order to better simulate actual operating conditions, the period between successive pulses generated by pulse generator 17 is not maintained constant but is subjected to a certain amount of variation by a so-called "jitter" generator 18. This generator is coupled to pulse generator 17 in a manner which allows it to control the synchronization of the generator and produce pulses whose interpulse spacing contains a certain amount of randomness.

Although the jitter generator 18 is shown as a single signal source, it would be pointed out that in actual practice this apparatus may consist of, for example, a first free-running oscillator whose frequency may be switch-selectable at increments of 10, 10.1, 10.2, 10.5 and 11.0 Hz and a second free-running oscillator, also switch-selectable, at 1, 2, 5 and 10 KHz. These two signals are superimposed such that only particular combinations of voltage and time will fire the basic oscillator. The low frequency selection thus defines the amount of dispersion or jitter about the basic oscillator frequency. With the above selection available, a randomly varying 1, 2, 5 or 10 KHz signal may be produced with 1, 2, 5 or 10 percent dispersion.

Pulse generator 17 is also under the control of a counter 19 coupled thereto in a closed loop circuit which regulates the number of pulses being produced. Thus, if the apparatus under test is to be evaluated with only a predetermined number of input signals, this number can be established by the setting of counter 19 and, once this number of pulses has been produced, this phase of the simulator system will be inactive until reset.

The outputs of the various diodes 14, 15, 16 are thus a predetermined number of pulsed RF signals at the S, C and X-band frequency, all possessing a certain amount of frequency instability due to noise source 13 and having a random interpulse spacing as determined by generator 18. Thus, instead of modulating the radio frequency carrier with, for example, a stable 1 KHz frequency, the action of jitter generator 18 permits modulation at this frequency but with selectable amounts of frequency instability, for example, 1, 2, 5 or 10 percent. As a result of this instability, the system better reflects actual operating conditions.

The output of diodes 14, 15, 16 are supplied to a second group of PIN diodes 23, 24 and 25. These diodes are biased to conduction by an antenna scan pattern generator 26 which can be selectively coupled to these different diodes through switch 27. The signal derived from generator 26 has a wave form which is calculated to impart to the input signals an amplitude envelope corresponding to that encountered in an actual operating environment where the radar signal, for example, is being spatially revolved in a particular antenna scanning (ground search) mode.

It will be appreciated that although only one pattern generator is shown connected to switch 27, a multiplicity of generators may be used with each having a particular wave form corresponding to the radar signal associated with a different antenna scanning configuration. In the case where the apparatus is intended to simulate a ground search radar, the scan pattern generator produces an amplitude envelope signal which contains a major lobe peak having appropriate first and second side-lobe minor peaks symmetrically positioned on opposite sides thereof. This signal is superimposed upon the modulated radio frequency signal such that the pulsing radio frequency signal amplitude changes with time and is not constant. This feature is significant, as mentioned previously, in that it allows a real-world checkout of the countermeasure systems' processing capability on minimum and/or changing amplitude emitter data. The decision-making mode of the system can therefore be evaluated, that is, should the aircraft's pilot be directed to ignore, evade or destroy the radar emitter.

The high power portion of the over-all system likewise contains an S-band, C-band and X-band oscillator, elements 30, 31 and 32, whose frequencies are also adapted to be varied by a noise source, not shown, so as to duplicate the performance of the signal sources in the low power system. However, the output of the individual oscillators are subjected to amplification in amplifiers 33, 34 and 35 before being applied to the diodes which modulate these carrier waves to produce the desired pulsed signals. The purpose of generating the high power signals is to permit saturation testing of the receivers that are part of the electronic countermeasure equipment.

Each power system thus has three different output lines, corresponding to a different frequency band, and a switching device, such as 28 in the low power system, is provided to selectively couple any one of these lines to an attenuator 29 or 36 feeding a hybrid junction 40. By means of this arrangement, for example, two signals of the same frequency can be extracted which have different modulation parameters or amplitude levels, representing either one or two completely independent radar targets. Likewise, two distinctly different signals may be formed at different frequencies with different modulation characteristics to permit a check of the priority decision-making capability of the apparatus under test.

The hybrid junction 40 multiplexes the two signals fed thereto from attenuators 29 and 36, and the output of this junction is coupled to a four-way power divider 41 which, in effect, channels these signals into four different lines in which these signals are available for further independent signal processing. Connected to the power divider by means of a suitable output port is a frequency meter 42 for initial target set-up purposes on the desired frequency or frequencies.

The four output lines 43, 44, 45, 46 contain independently controlled, precision step attenuators, such as 47, and, thereafter, a suitable array of coaxial switches, such as 48, for further subdividing these lines into a greater number of branches. Each of these branches includes vernier attenuators, such as 49 and 50, which can modify the signal level in a manner which gives the appearance of a signal source that is, in effect, moving into a different apparent spatial location with respect to the electronic countermeasure equipment. After this attenuation, all of the branch lines may be directly connected via suitable connectors to what corresponds to the antenna input ports of the electronic countermeasure receivers. Because of this direct connection, an RF power algorithm is established which relates power measurement to an apparent spatial location with respect to the boresight of, for example, any aircraft which might be carrying electronic countermeasure equipment similar to that under test. For this purpose, each of the branch lines contains suitable switching apparatus for selectively feeding the signal appearing in that line to a digital microwave power meter, such as 51. The independently-controllable (in amplitude) eight lines can be set up such that the lines that are the forward-looking antenna inputs are set to a maximum signal level, and the other six lines set at relatively smaller signal levels, thus creating a spatial location of a signal coming at the front of the aircraft, or the rear, or the side, as desired.

For simplicity's sake, only one output line from power divider 41 is shown with its various attenuators and complementary switching devices. However, each of the output lines is so constructed to yield eight possible output connections with four adapted to be directly wired to the input of the countermeasure receiver and four adapted to be coupled to power meters, such as 51.

What is claimed is:

1. Apparatus for simulating the operation of a plurality of radar transmitters comprising, in combination,
an S-band, C-band and X-band oscillator,
   each of said oscillators being controlled by a Gaussian noise source such that the output signal of these oscillators varies in frequency in a random manner about a median value;
a pulse generator for producing a sequence of pulses,
   said pulse generator being controlled such that the time interval between adjacent pulses of said sequence is irregular;
means for modulating the output signals from said oscillators such that radio frequency pulses are produced corresponding in time and duration to said pulses;

means for controlling the relative amplitude of said radio frequency pulses so as to develop a sequence of radio frequency pulses which corresponds to the radio frequency pulses radiated in a particular direction by a radar transmitter that is operating in a particular scanning mode; and means for selectively connecting a particular sequence of amplitude modulated radio frequency pulses to an output circuit so as to have them available thereat for testing the performance of electromagnetic countermeasure equipment.

2. Apparatus for simulating the performance of a plurality of radar transmitters which are operating in a particular scanning mode comprising, in combination, an S-band, C-band and X-band oscillator,
each of said oscillators being under the control of a Gaussian noise source such that the output signal of each oscillator is a continuous signal whose frequency randomly varies about a median value;

means for coupling the output signal of each oscillator to one input of a PIN diode;

means for generating a first sequence of pulses whose interpulse spacings show a jitter effect such that these pulses occur at irregular time intervals;

means for feeding said sequence of pulses to the control electrode of each PIN diode whereby corresponding radio frequency pulses at said S, C and X-bands appear in the output circuit of each PIN diode;

means for controlling the amplitude of said radio frequency pulses such that each sequence of radio frequency pulses correspond to the radio frequency pulses that are radiated in a particular direction by a radar set whose antenna has a particular scanning pattern;

a network of signal attenuating means; and means for coupling one of said particular pulse sequences to said network whereby said particular pulse sequence may be subjected to variable amounts of attenuation before being coupled to the electronic countermeasure equipment that is to be tested.

3. In an arrangement as defined in claim 2, means for producing a sequence of amplified radio frequency pulses at said S, C and X-bands,
said amplified radio frequency pulses also having irregular time intervals between pulses;

means for controlling the relative amplitudes of said amplified radio frequency pulses so as to have these pulses correspond to the radio frequency pulses that are radiated in a particular direction by a radar set whose antenna has a particular scanning pattern; and means for selectively coupling said amplified pulse sequence to said network of signal attenuating means.

* * * * *